May 3, 1927.

J. R. PEIRCE 1,626,871

ACCOUNTING MACHINE

Original Filed July 9, 1924      15 Sheets-Sheet 1

Inventor
John Royden Peirce
By his Attorneys Cooper, Kerr & Dunham

May 3, 1927.
J. R. PEIRCE
1,626,871
ACCOUNTING MACHINE
Original Filed July 9, 1924    15 Sheets-Sheet 2
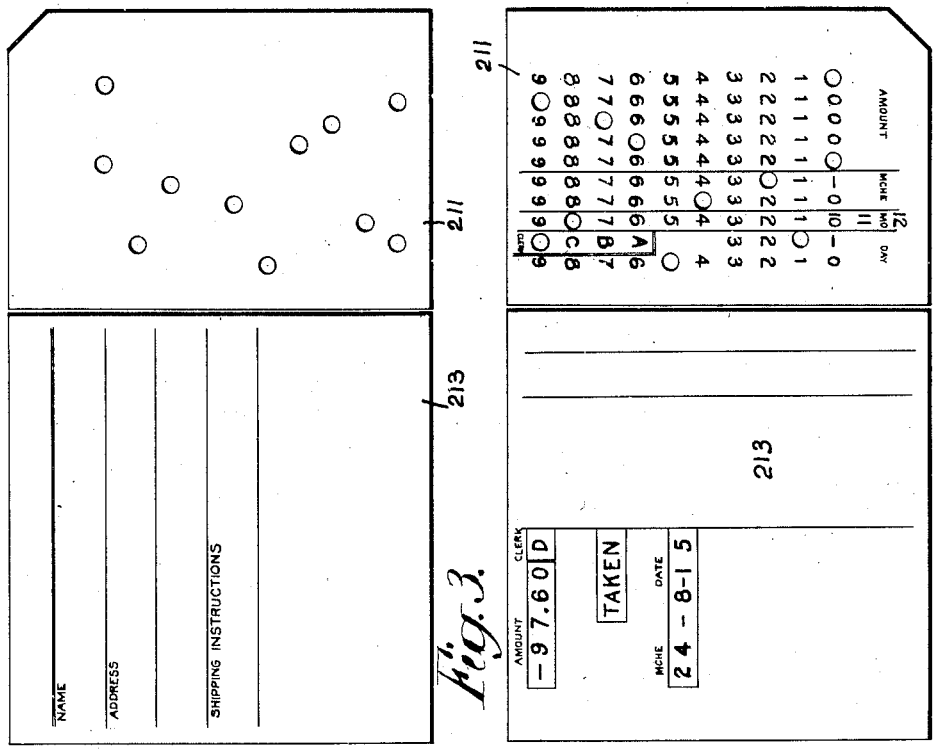
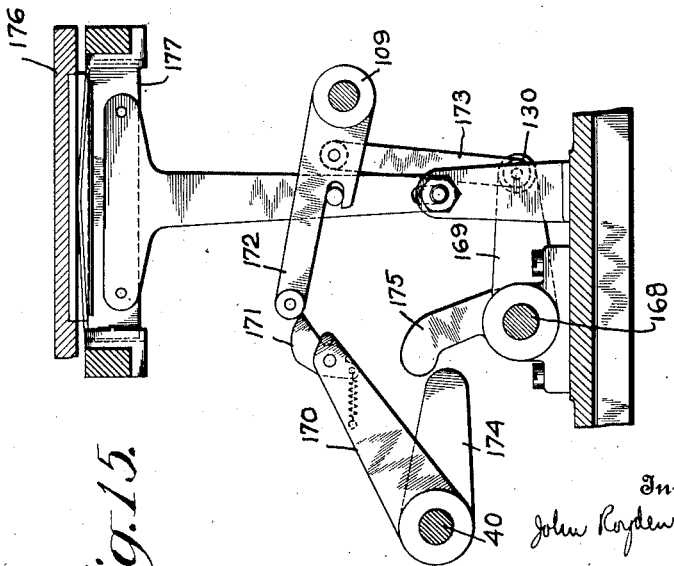
Inventor
John Royden Peirce
By Cooper, Kerr & Dunham
his Attorneys

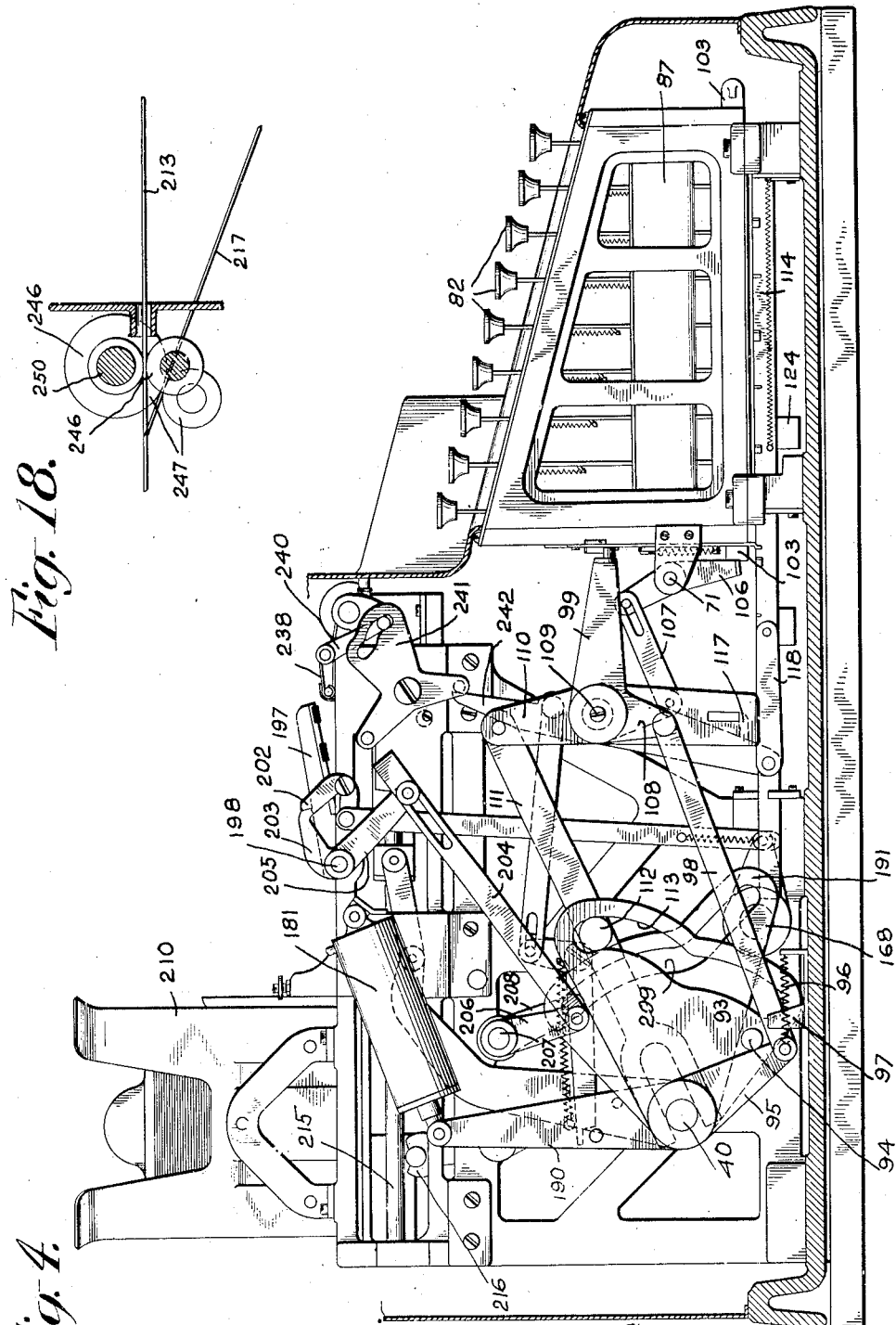

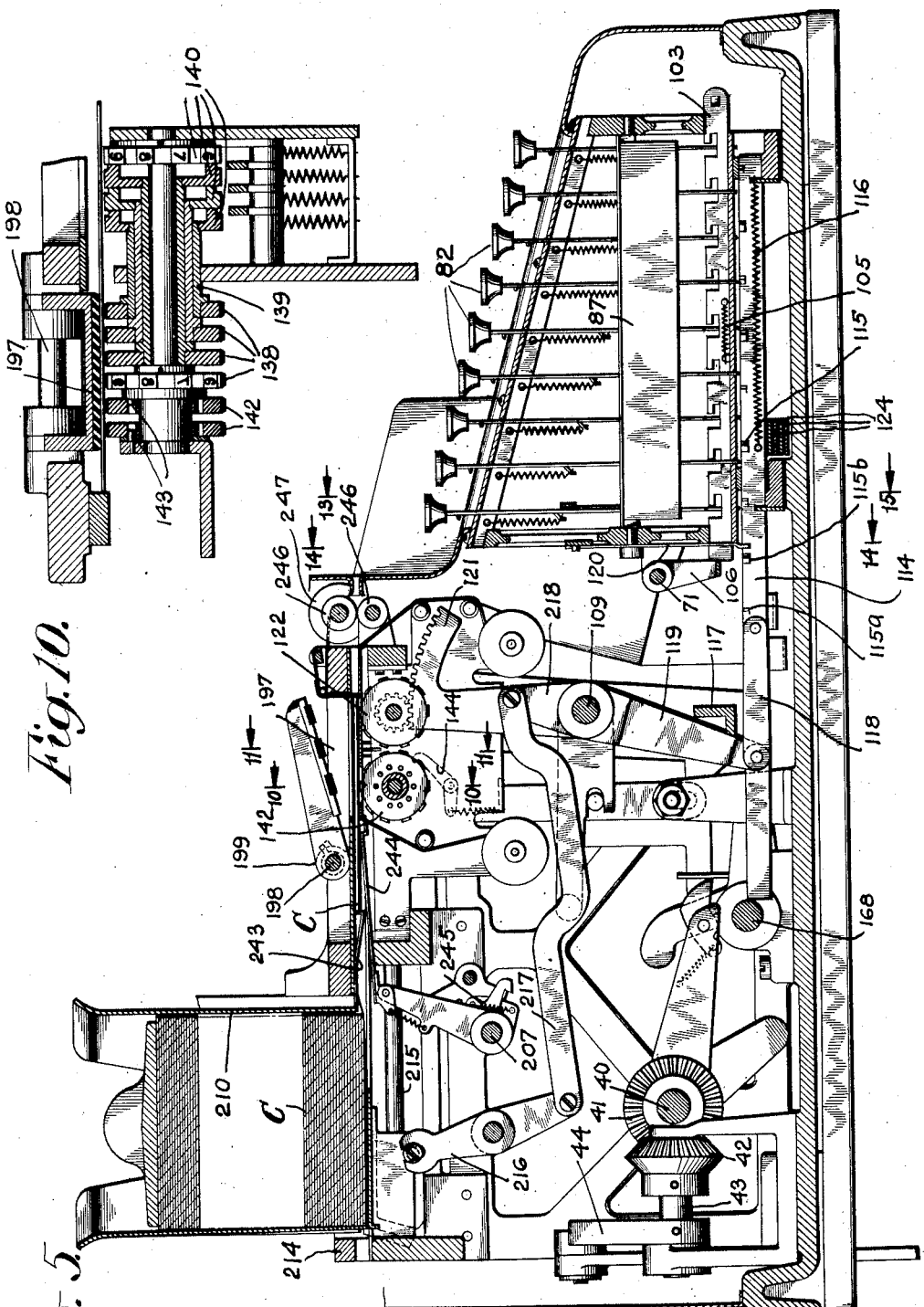

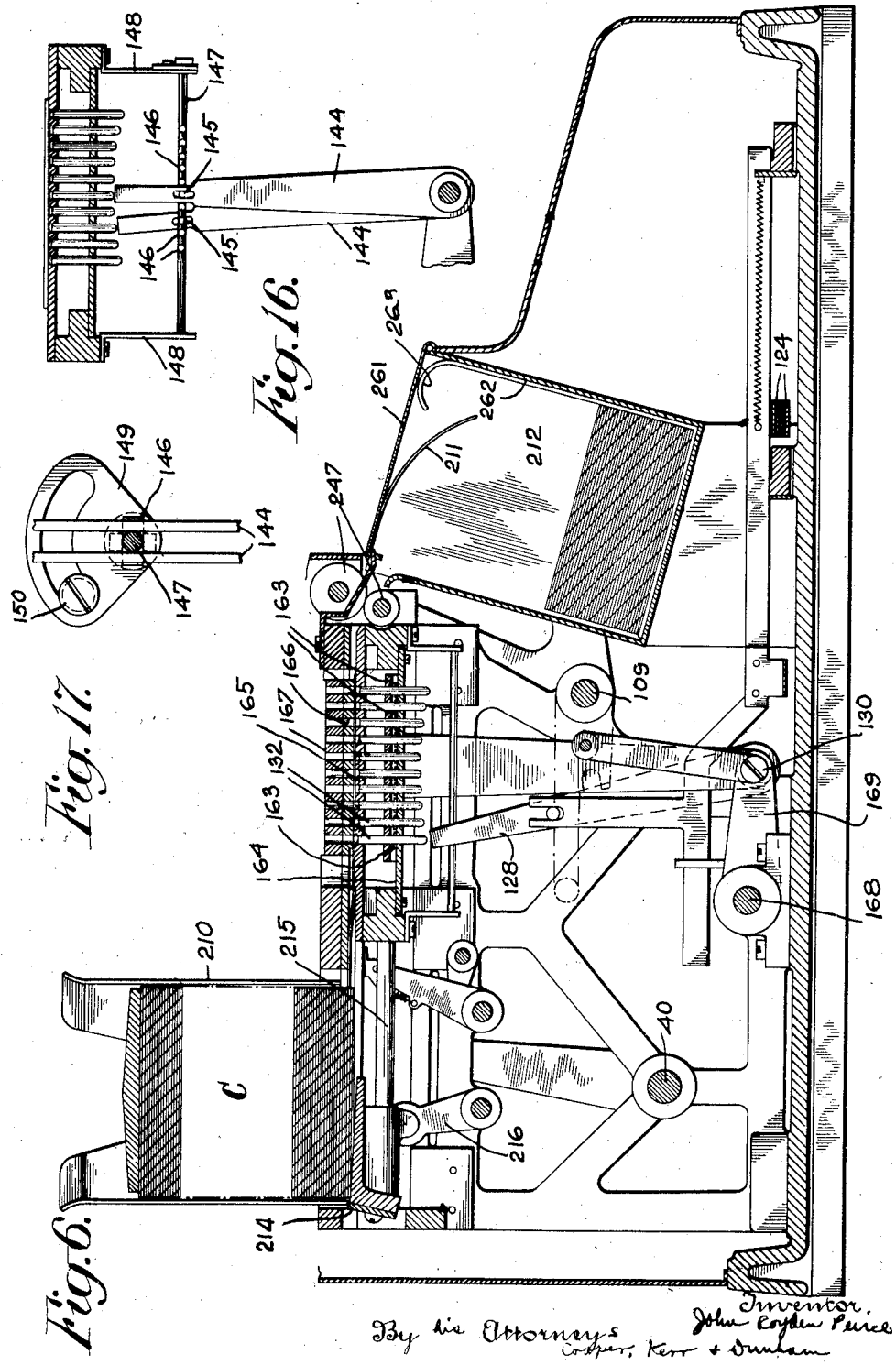

May 3, 1927.
J. R. PEIRCE
1,626,871
ACCOUNTING MACHINE
Original Filed July 9, 1924   15 Sheets-Sheet 6
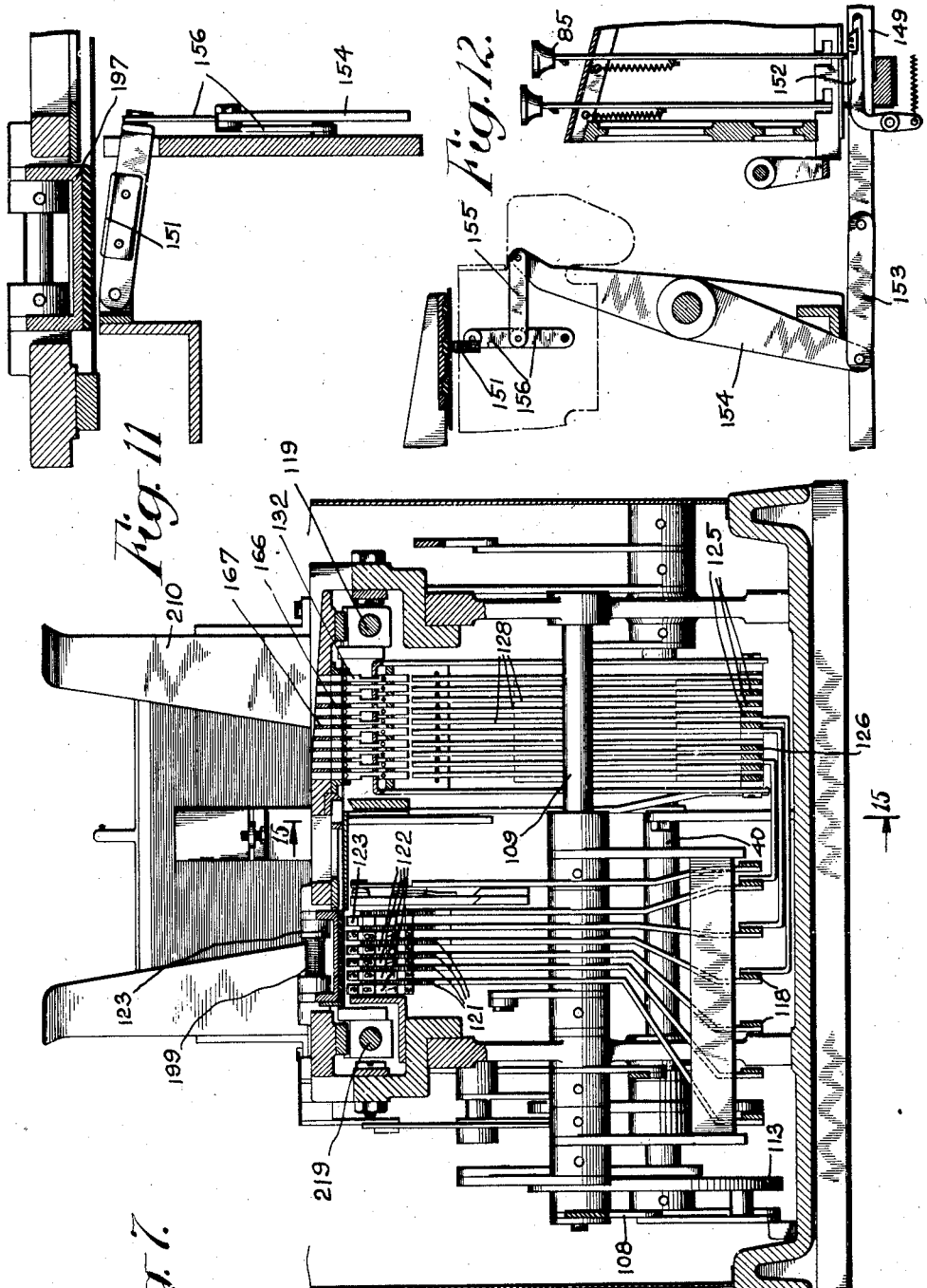
Inventor
John Royden Peirce
By his Attorneys
Cooper, Kerr & Dunham May 3, 1927. 1,626,871
J. R. PEIRCE
ACCOUNTING MACHINE
Original Filed July 9, 1924 15 Sheets-Sheet 7
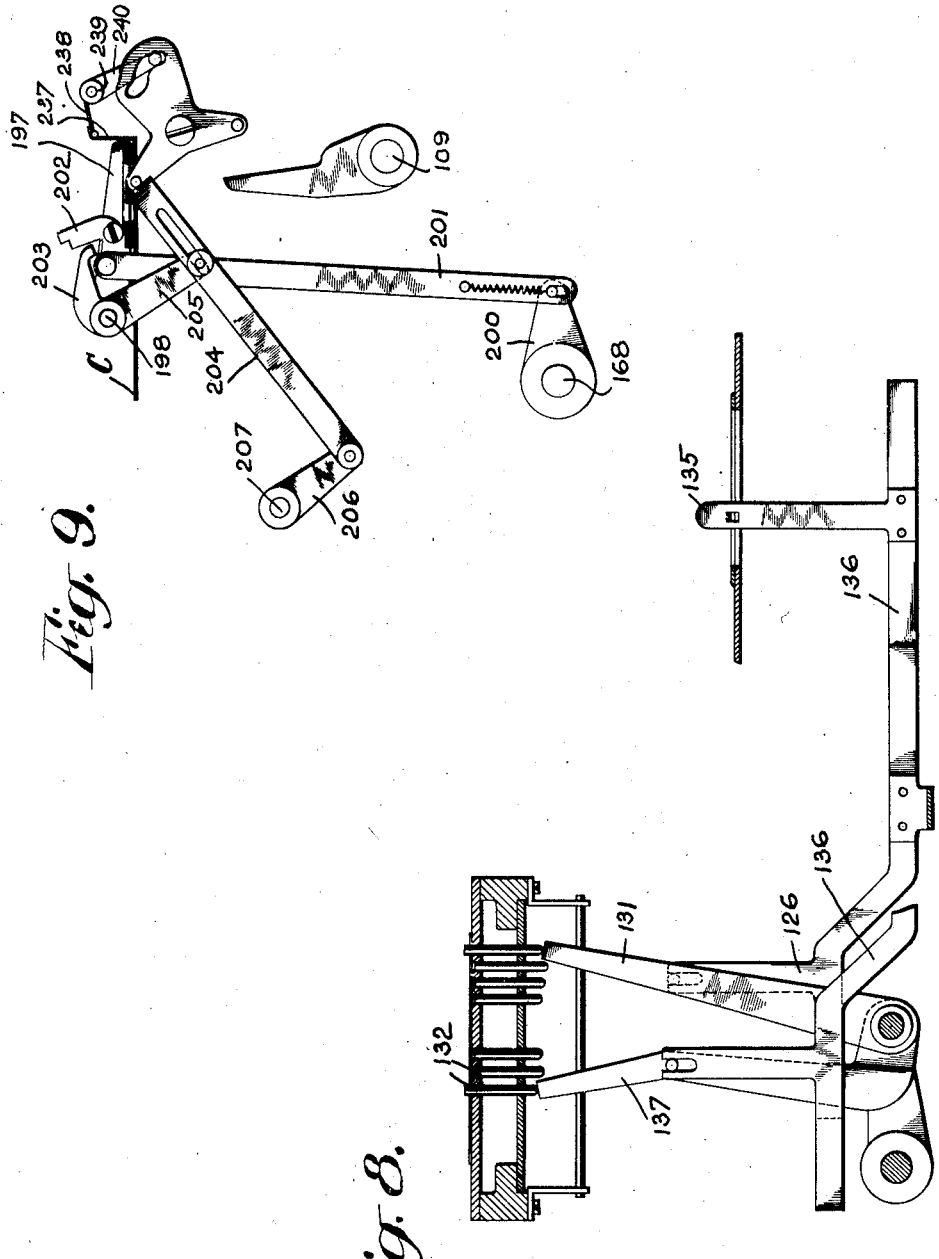
Inventor
John Royden Peirce
By Cooper, Kerr & Dunham
his Attorneys May 3, 1927.
J. R. PEIRCE
1,626,871
ACCOUNTING MACHINE
Original Filed July 9, 1924  15 Sheets-Sheet 8
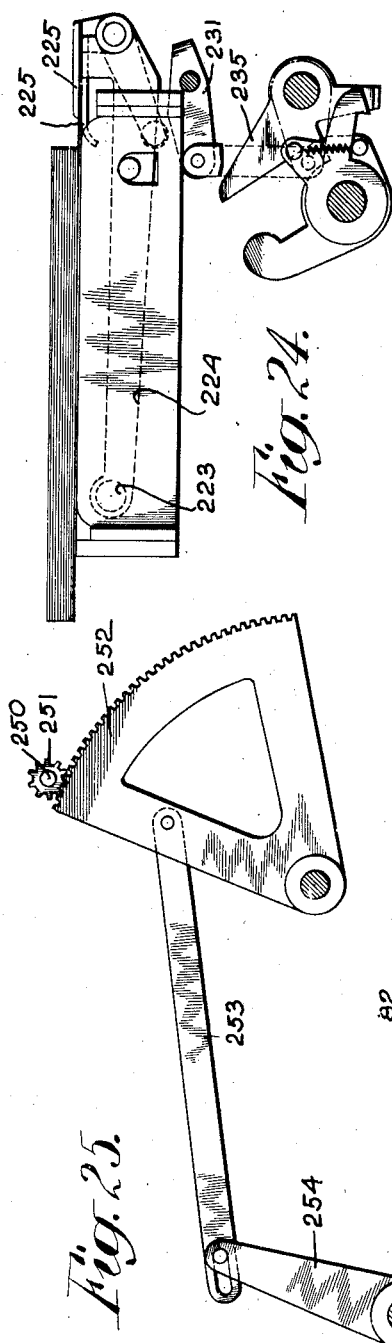
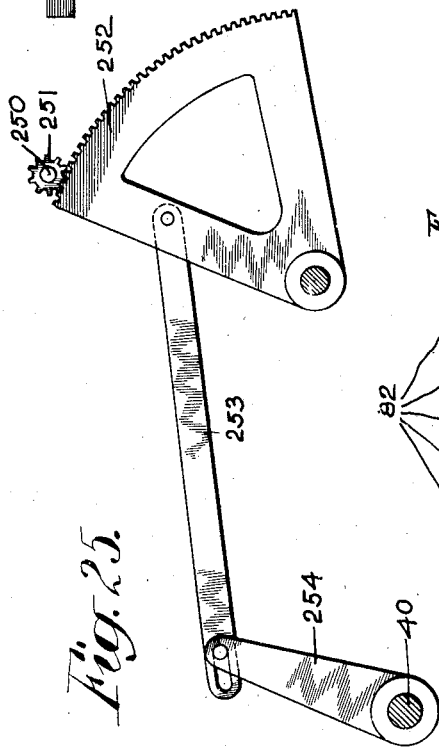
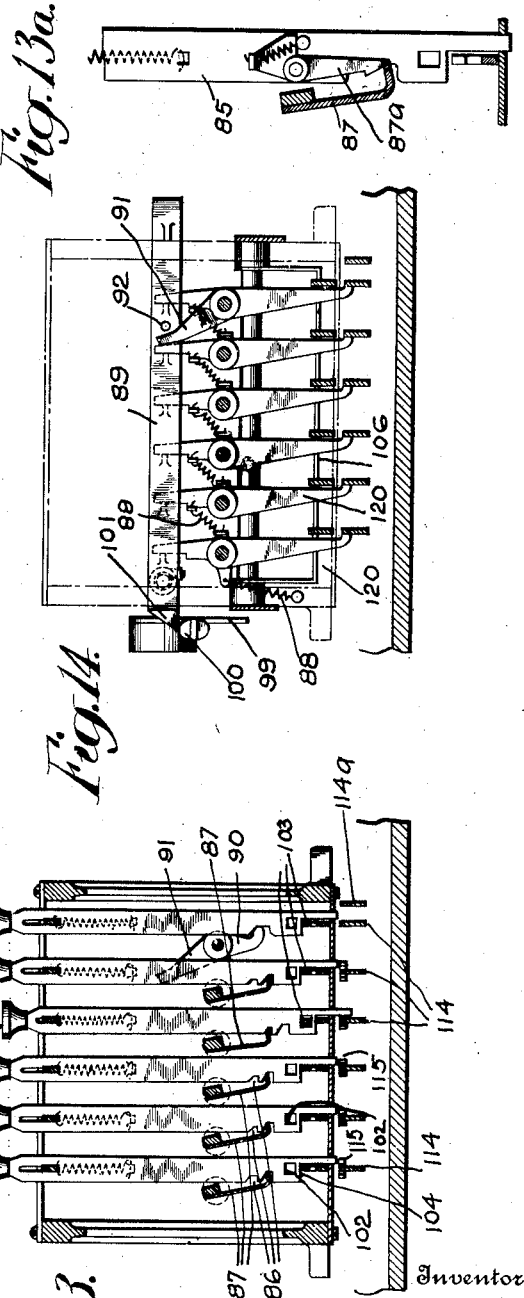
Inventor
John Royden Peirce
Cooper, Kerr & Dunham
Attorneys May 3, 1927.
J. R. PEIRCE
1,626,871
ACCOUNTING MACHINE
Original Filed July 9, 1924   15 Sheets-Sheet 9
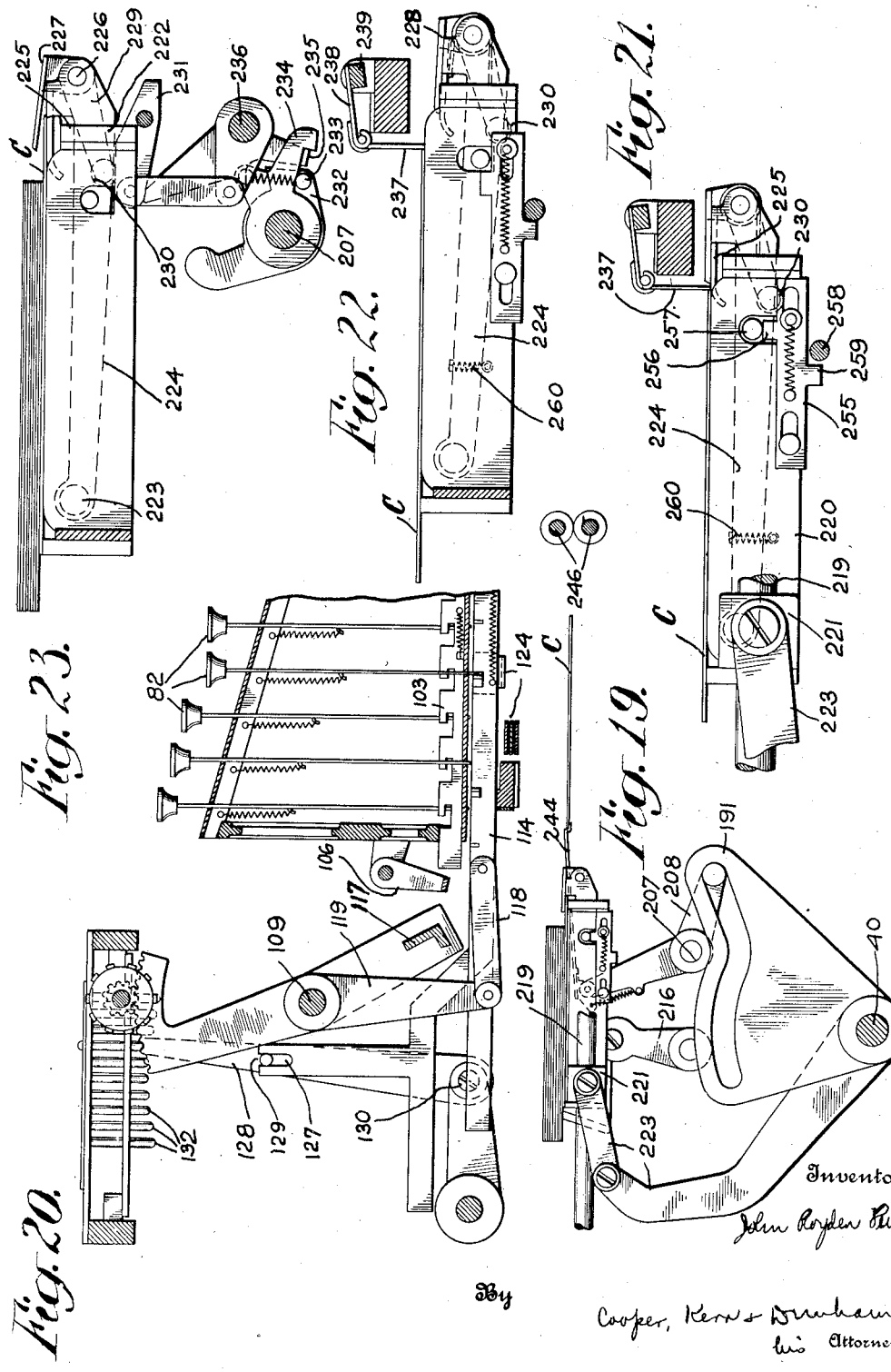
Inventor
John Royden Peirce
By Cooper, Kerr & Dunham
his Attorneys

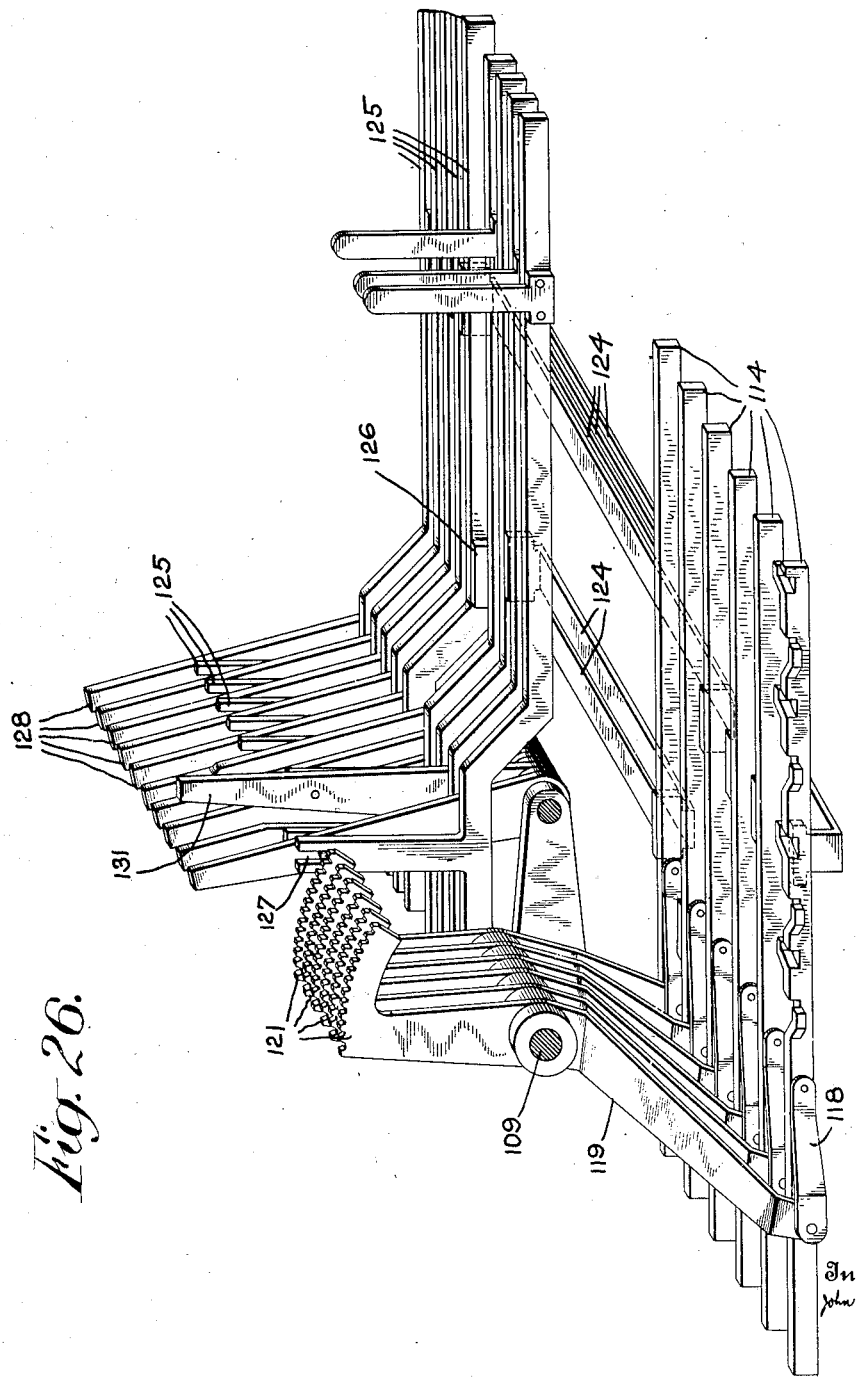

May 3, 1927. 1,626,871
J. R. PEIRCE
ACCOUNTING MACHINE
Original Filed July 9, 1924    15 Sheets-Sheet 11
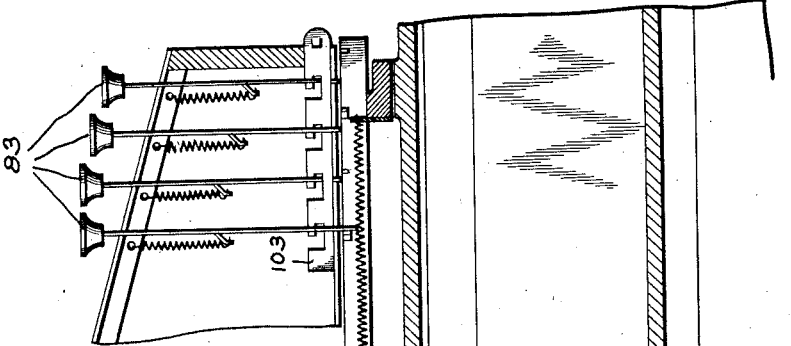
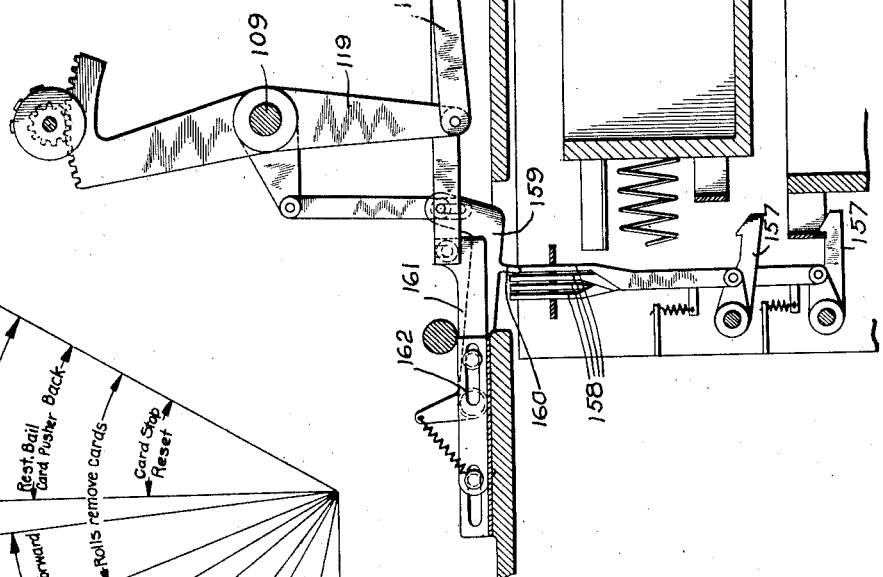
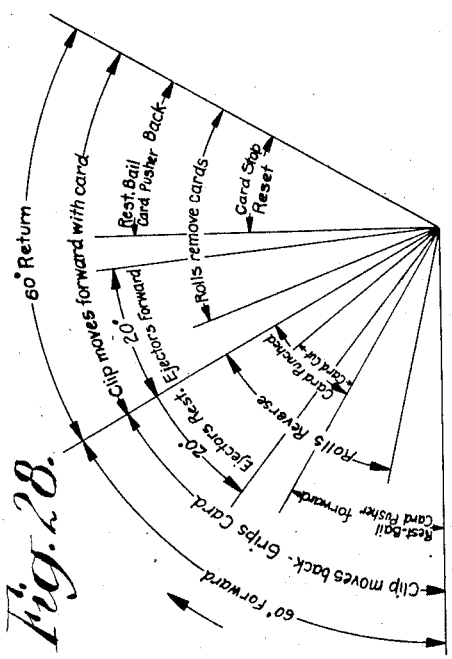
Inventor
John Royden Peirce
By Cooper, Kerr & Dunham
his Attorneys

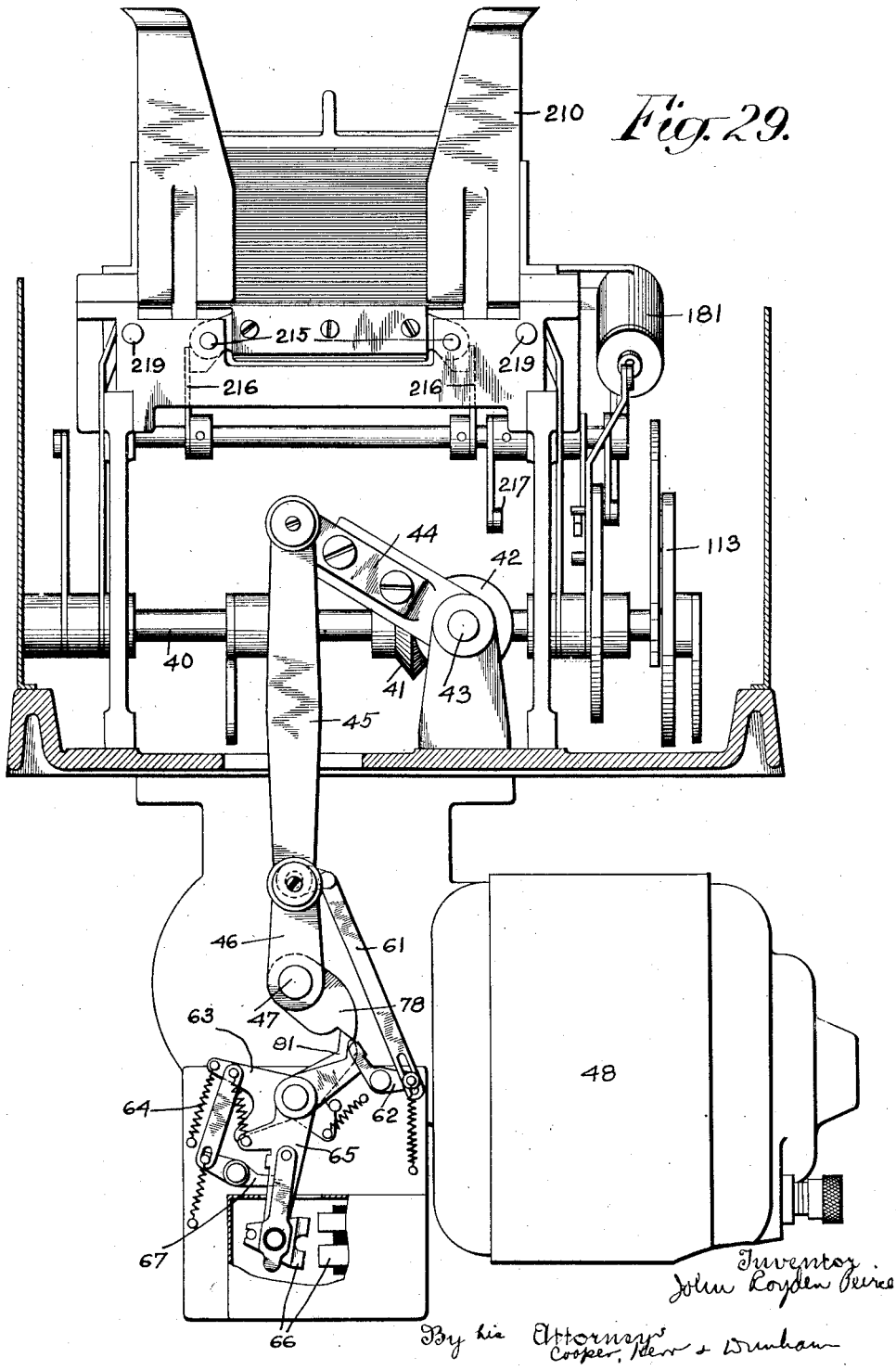

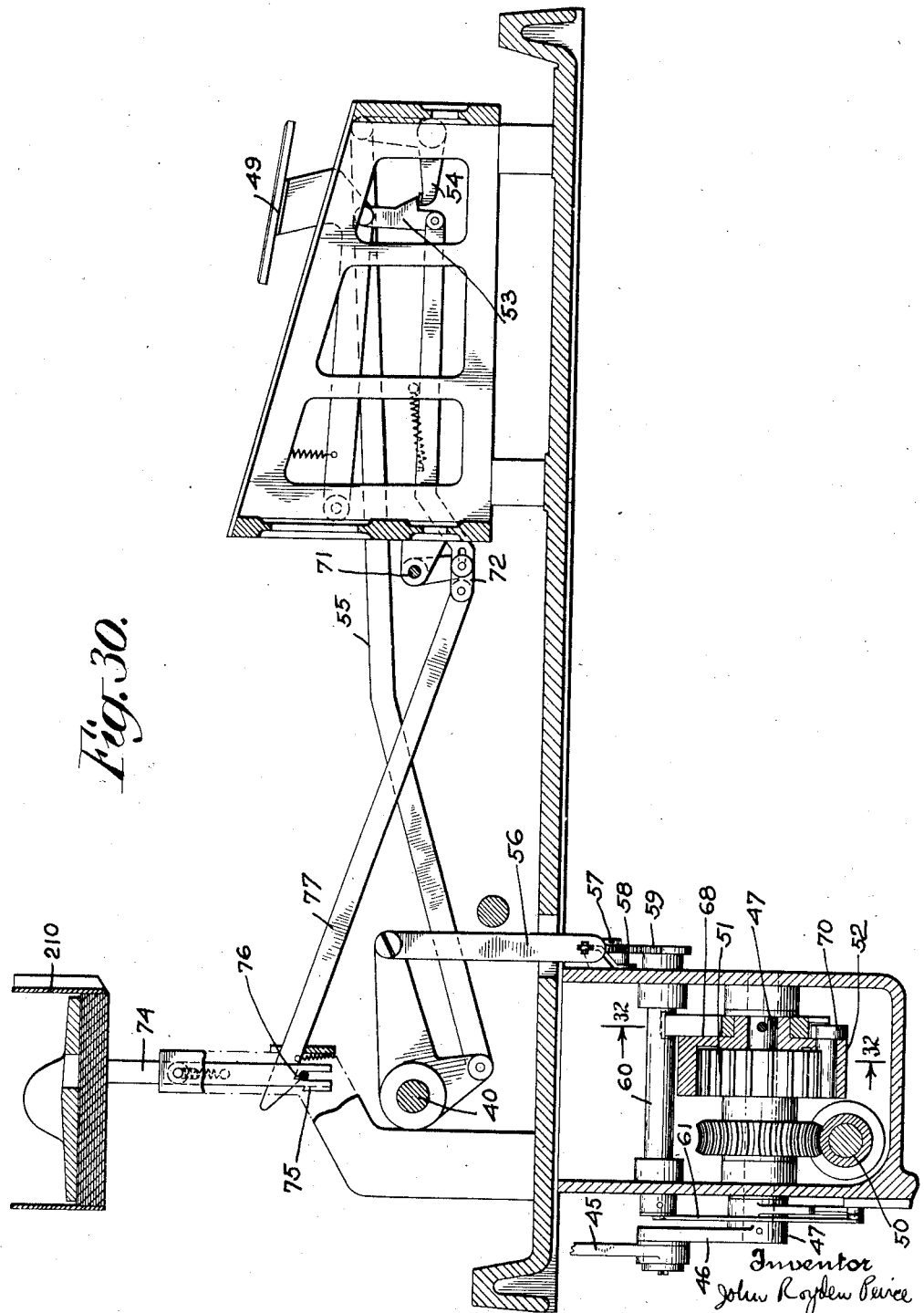

May 3, 1927.

J. R. PEIRCE

ACCOUNTING MACHINE

Original Filed July 9, 1924   15 Sheets-Sheet 14

1,626,871

Inventor
John Royden Peirce

By
Cooper, Kerr & Dunham
his Attorneys

May 3, 1927.
J. R. PEIRCE
ACCOUNTING MACHINE
Original Filed July 9, 1924   15 Sheets-Sheet 15
1,626,871
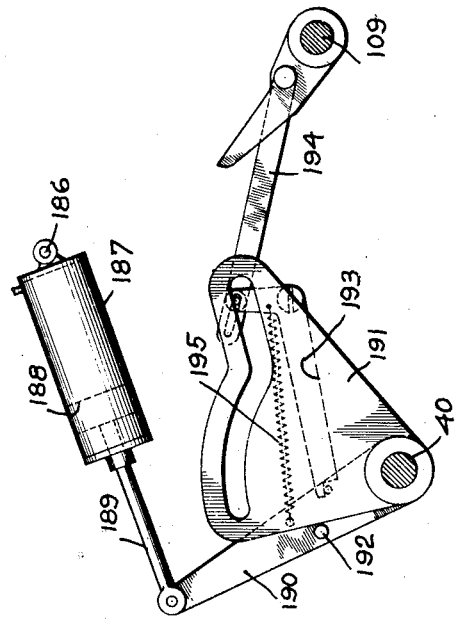
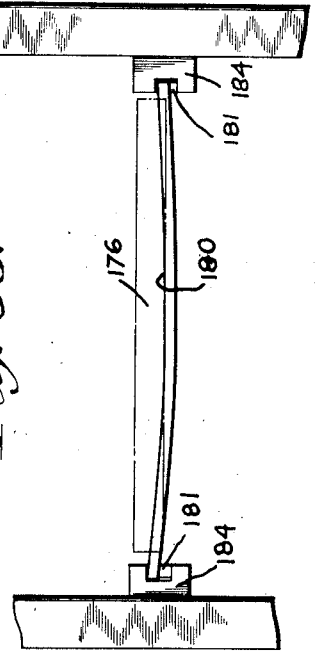
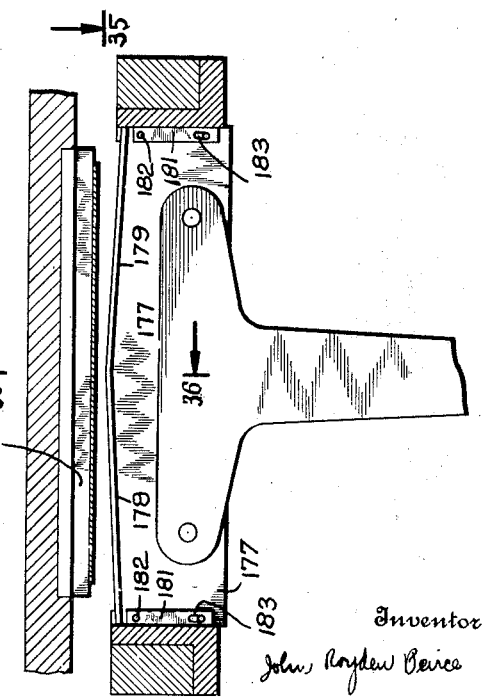

Patented May 3, 1927.

1,626,871

UNITED STATES PATENT OFFICE.

JOHN ROYDEN PEIRCE, OF NEW YORK, N. Y., ASSIGNOR TO INTERNATIONAL BUSINESS MACHINES CORPORATION, OF NEW YORK, N. Y., A CORPORATION OF NEW YORK.

ACCOUNTING MACHINE.

Original application filed July 9, 1924, Serial No. 724,933. Divided and this application filed December 23, 1924. Serial No. 757,589.

This invention relates to accounting machines and has particular reference to machines for making classification records of transactions as they occur. The present application is a division of my copending application, Serial No. 724,933, filed July 9, 1924.

One object of the invention is to provide a machine suitable for use at various sales stations in retail stores or any other place where a classified analysis of transactions is desired and where there is a central installation of devices for tabulating and totaling the transactions according to various classes. In the present embodiment the machine is designed to effect classification according to the various clerks handling the transactions, but as will be clearer later on, the classification may just as readily be made according to machine numbers or departments or the kind of goods sold or the kind of transaction, that is, whether cash, charge, C. O. D. and the like. It will also be apparent later that the classification may be effected by having a separate machine for each clerk or class of transaction and that many of the inventive ideas are not limited in their application to machines having a plurality of clerk's or classification keys.

Another object of the invention is to provide a machine of the kind mentioned which is simple in construction, quick in its operation and which requires a minimum amount of power for operating it. With these ends in view, the invention comprises a number of novel features, among which are the punch selecting and operating mechanism, the severing mechanism and its cooperation with the punching mechanism to prevent the incorrect severing, the feeding mechanism for feeding the severed portions of the card in different directions and at different speeds to prevent one portion of a card from interfering with or causing incorrect movements of the other portion, the mechanism for efficiently blowing the punchings away from the perforating mechanism while permitting the use of a comparatively small and compact blowing apparatus, the devices whereby the keys in a single bank or row of keys may be employed to control independent type when the keys are operated in a certain sequence, a platen operating mechanism whereby a platen may be operated to print and restored to original position during a small part of the cycle of movement of an operating or driving mechanism, the feeding mechanism for withdrawing cards from a magazine or source of supply and successively delivering the cards to the printing, perforating and severing devices and then delivering the portions to the operator and to a locked compartment, the mechanism which becomes effective to prevent further operations of the machine when the supply of cards is exhausted and which is rendered ineffective when the supply is replenished, and the mechanism for selecting and releasing the cash drawers. All of these and other novel features will be fully described later on.

With the foregoing and other and incidental objects in view, the invention consists in the novel construction and arrangement of parts, the features of novelty of which are pointed out in appended claims and a preferred form of embodiment of which is shown in the accompanying drawings accompanying and forming a part of this specification.

In said drawings:

Figs. 2 and 3 are respectively back and front views of the tabulating cards as punched and printed by the machine.

Fig. 4 is a side elevation of the machine taken on line 4—4 of Fig. 1.

Fig. 5 is a sectional view of the machine taken on line 5—5 of Fig. 1.

Fig. 6 is a sectional view through the punching section of the machine taken substantially on lines 6—6 of Fig. 1.

Fig. 7 is a transverse sectional view taken substantially on line 7—7 of Fig. 1.

Fig. 8 is a detail sectional view taken substantially on lines 8—8 of Fig. 1 and showing the tens of days date setting mechanism and the means for controlling the punches in accordance therewith, also the clerks' punches and a part of the mechanism for controlling their operation.

Fig. 9 shows a detail view of certain mechanism shown in Fig. 4 in moved position. This mechanism is adapted to actuate and restore the platen and position the card abutment.

Fig. 10 shows the means for setting the date and machine number type wheels. The section is taken substantially on lines 10—10 of Fig. 5.

Fig. 11 is a detail view of the operating mechanism for printing the word "Taken" upon the check or card. The section is taken substantially on lines 11—11 of Fig. 5.

Fig. 12 is another view of the same mechanism showing its control from the keyboard.

Fig. 13 is a transverse sectional view through the keyboard section of the machine taken substantially on lines 13—13 of Fig. 5 and shows the key detent and key locking mechanism.

Fig. 13ª shows a detail of the supplementary latch on the send key.

Fig. 14 shows the restoring mechanism for the keyboard detents and locking devices. This view is taken substantially on lines 14—14 of Fig. 5.

Fig. 15 is a detailed view of the knife and punch actuating and restoring mechanism. This section is taken on line 15—15 of Fig. 7.

Fig. 16 shows the mechanism for setting up the machine number upon the punches.

Fig. 17 is a diagrammatic view showing the method of adjusting the machine number of punch selectors.

Fig. 18 is a detail view of the feed-out devices for the receipt and the perforated stub portions of the check or card.

Fig. 19 is a side detail view of the card feeding devices including the picker, the clip mechanism and the ejector devices.

Fig. 20 is a detail view of certain parts shown in Fig. 5 in moved position.

Fig. 21 is a detail view of the card feeding mechanism, particularly the clip structure and shows the position of the cards just as the cards are stripped from the clip.

Fig. 22 shows the same parts slightly later in the cycle.

Fig. 23 shows the card feeding mechanism with the card being advanced into the jaws of the clip.

Fig. 24 shows the same parts slightly later in the cycle with the clip closed upon and gripping the leading edge of the card.

Fig. 25 shows the mechanism for actuating the card and stub feed-out rolls.

Fig. 26 is a perspective view of the linkages extending from the punch selectors and type wheels to the key-board. This view shows the transposer connections.

Fig. 27 is a detail view showing the cash drawer controlling mechanism and the connection to the type wheels for setting up the clerk numbers.

Fig. 28 is a timing diagram of the machine.

Figure 1:
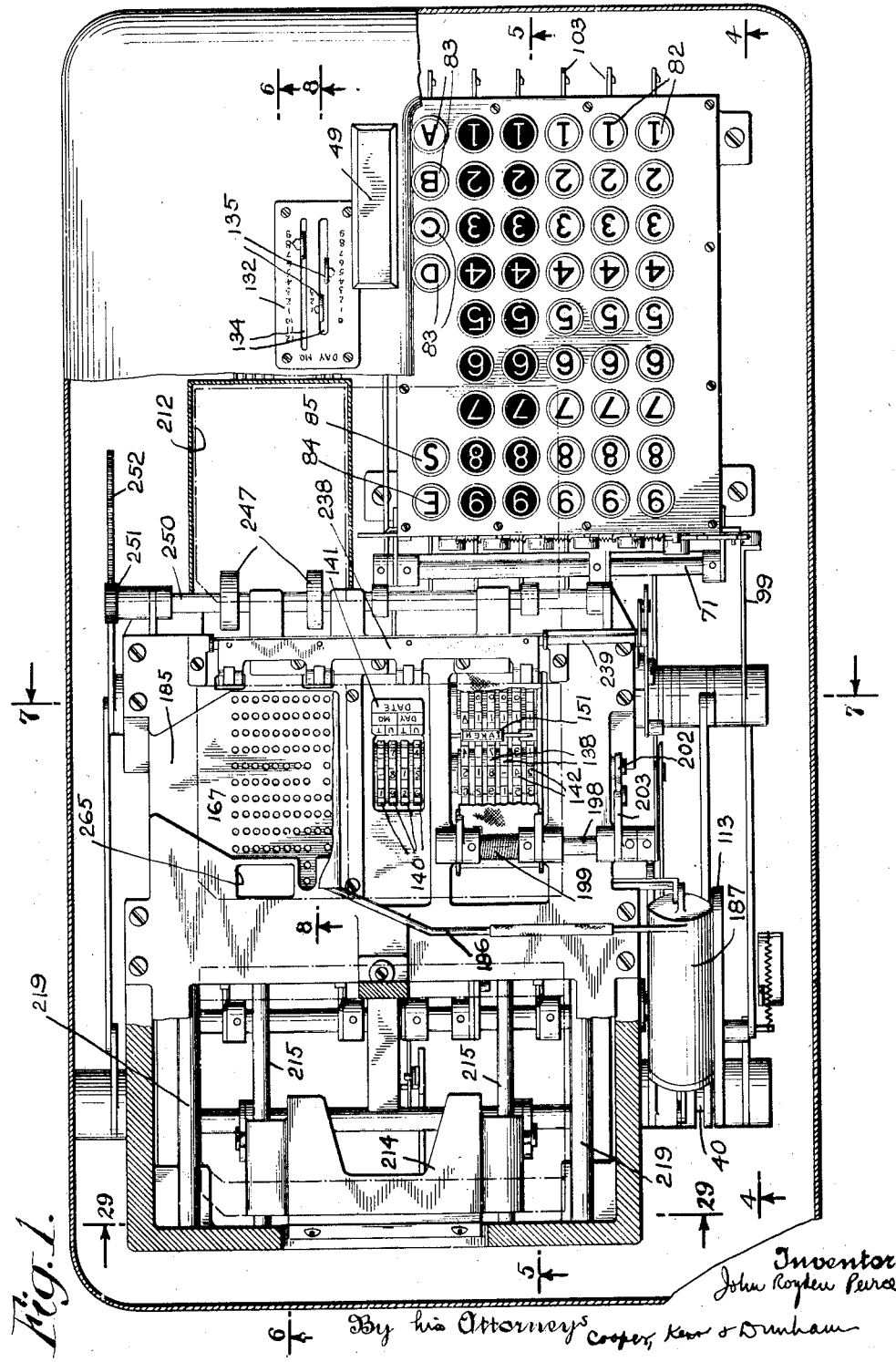
Fig. 1 is a top plan view of the machine with certain parts broken away to show the interior construction, and with portions of the cover or casing removed.

Fig. 29 is a rear view of the machine, the section being taken substantially on lines 29—29 of Fig. 1. This view also shows certain of the driving connections to the motor disposed below the base plate of the main portion of the machine.

Fig. 30 is a view showing connections between the operating button and the machine clutch. This view also shows the devices for interrupting the machine operation when the card supply is exhausted.

Figure 31:
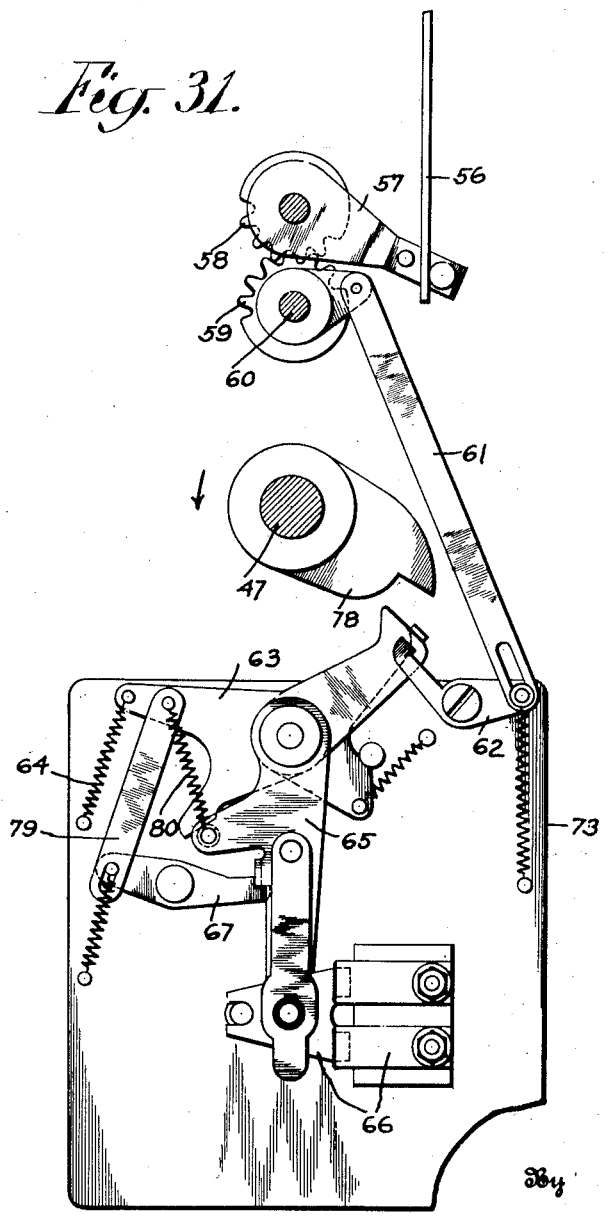

Fig. 31 is a view of certain of the operating parts shown in Fig. 29 in moved position.

Figure 32:
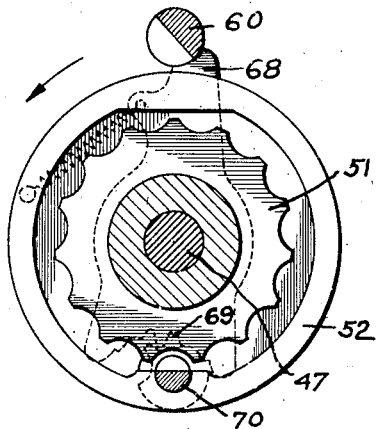

Fig. 32 is a detail sectional view of the lower drive clutch mechanism taken substantially on lines 32—32 of Fig. 30.

Figure 33:
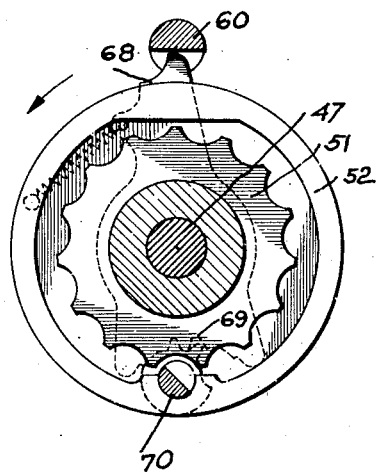

Fig. 33 is a similar view showing the parts in moved position.

Fig. 34 is an enlarged detail of the knife shown in Fig. 15.

Fig. 35 is a top plan view of the knife looking in the direction of the arrows 35—35 of Fig. 34.

Fig. 36 is a detail sectional view taken on line 36—36.

Fig. 37 is a detail view of the blower operating mechanism. This blower is for ejecting the chips from the machine.

*Main drive.*

Referring to Fig. 5, 40 is the main actuating shaft of the machine. This is rocked back and forth at each machine cycle to actuate the various parts of the mechanism. Preferably but not essentially this shaft is operated by an electrical motor. If desired, however, a suitable manual handle could be provided for rocking this shaft. In order to rock shaft 40 from the motor a driving train is provided including clutch devices which will now be described.

Fixed to shaft 40 is a suitable bevel gear 41 meshing with a bevel gear 42 fast to shaft 43. Shaft 43 carries a crank 44 (see Fig. 29), which crank through link 45 connects with a supplementary crank 46 fixed to shaft 47. In order to drive the shaft 47 and impart to it one revolution each time it is desired to operate the machine a driving motor 48 is provided. The operation of this motor is controlled by an operating button 49 (Figs. 1 and 30) disposed adjacent the keyboard of the machine. The arrangement of the parts is such that one revolution of shaft 47 will effect one rocking cycle of shaft 40.

Motor 48 through a worm gearing 50 (Fig. 30) rotates clutch element 51 which is loose upon the shaft 47. Fixed to shaft 47 is a clutch wheel 52. The clutch is more clearly shown in Figs. 32 and 33. It is of the one revolution type.

Referring again to Fig. 30, depression of the operating button 49 through shoulder member 53 is adapted to rock a bell crank 54 which through linkage 55 depresses link 56. Link 56 is shown in depressed position in Fig. 31. The depression of this link rocks an arm 57 fixed to a pivotally mounted gear 58 which in turn meshes with the gear 59 fixed to shaft 60. A linkage 61 is also crank-connected to shaft 60 and extends downwardly and at its lower end has a lost motion pin and slot connection with the dog 62, shown in its normal locking position in Fig. 29. Upon the drawing upward of link 61 the dog 62 will be swung to the position shown in Fig. 31 thus releasing a pivoted plate 63 and permitting the same to swing anticlockwise under the influence of spring 64. This movement of plate 63 is sufficient to rock a member 65 in an anticlockwise direction and close switch 66. This puts the motor into operation. The switch is maintained in closed condition by means of a latch 67 (Fig. 31). Just after the motor commences to rotate the shaft 47 is clutched to the motor driven gearing 50 by the parts which will now be described.

Referring to Fig. 32, shaft 60 is shown in its normal position before it is unlocked. This shaft is notched as shown and, upon being turned to set the motor into operation, assumes the position shown in Fig. 33. When in this position a plate 68 is permitted to be drawn by its spring to the position shown. This plate is provided with gear teeth 69 at its lower end intermeshing with corresponding teeth fixed on a clutch element 70. The rocking of the plate 68 rocks the clutch element 70 into the position shown in Fig. 33 thus coupling shell 52 in which element 70 is mounted to the clutch element 51. Thereafter the entire clutch assembly makes one revolution in an anticlockwise direction. At the end of the operation cycle of the machine, a shaft 71 (Figs. 4 and 30) is rocked in a manner which will hereinafter be described in connection with the keyboard mechanism. This shaft 71 upon being rocked clockwise draws a link 72 to the right thus disengaging member 53 from bell crank 54 and permitting the assembly 54, 55, 56, to be restored irrespective of the continued depression of the operating button 49. Restoration of this linkage is effected by means of spring 73 (Fig. 31).

Should cards become exhausted it is desirable that the operation of the machine be prevented. Referring to Fig. 30, a suitable upwardly pressed spring plunger 74 presses upon the cards in the card magazine and when the last card is exhausted from the magazine this plunger can move upwardly from the position shown. The lower end of the plunger is provided with a locking projection 75 which is normally out of the path of a hooked end 76 on a link 77 which is connected to part 72. If part 75 is in upper position at the time shaft 71 is rocked, link 77 will be forced to the left engaging 76 with 75 thus retaining part 53 out of engagement with bell crank 54. Consequently thereafter there can be no operation of the motor until the storage magazine is replenished with cards.

At the end of an operation cycle cam 78 on shaft 47 (Fig. 31) is adapted to contact with the pivoted plate 63 and swing it in a clockwise direction thus drawing up on link 79 and tensioning spring 80 to concurrently unlock the switch element 66 and swing it into open position. Subsequently 62 relatches on 63 and a supplemental pivoted plate 81 falls behind cam 78, as shown in Fig. 29, to prevent rebound of the parts. At this time the clutch is disengaged, member 70 being displaced from the position shown in Fig. 33 to that shown in Fig. 32.

Keyboard.

Referring to Fig. 1, the keyboard comprises a plurality of amount keys 82 arranged in banks, a group of clerks' keys 83, an error key 84 and a contact key 85. Any desired capacity of the amount key banks may be provided as desired. As here shown, the machine has a capacity of $999.99. The so-called "Send" key 85 being in the same bank with the clerk's initial keys 83 must be provided with a supplemental latching mechanism to permit both keys to be operated and held depressed. This supplementary detent comprises a pivot latch 87ᵃ pivoted upon the shank of the send key 85 and cooperating with the bail 87. By this arrangement in case it is desired to operate both the clerk's initial and the "Send" key the operator presses the clerk's initial key first and thereafter depresses the send key. In this way both keys are latched down. If the send key is operated first and the clerk's initial afterwards the send key will be released upon the depression of the clerk's initial key.

Referring to Figs. 5 and 13, the keys are slidably mounted and are drawn upwardly by springs in the usual manner, and are provided with detent notches 86. With each detent notch bails 87 cooperate to arrest the keys in depressed position. The detent bails are yieldingly pressed into engagement with the keys by means of the springs 88 shown in Fig. 14. The keyboard is of the usual flexible construction. Release of the keys after an operation or simultaneous release of the keys by manipulation of the error key is secured through means of a restoring bar 89. To simultaneously release all of the keys by the depression of the error key the error key cooperates with a finger 90 which has connected to it an upwardly extending finger 91 disposed adjacent a pin 92 on restoring bar 89. Depression of the error key rocks finger 91 in a clockwise direction and thereby rocks all of the key bails 87 to release all the keys. At the proper time in the machine cycle the keys are also released by forcing restoring bar 89 in a transverse direction. Referring to Fig. 4, on shaft 40 there is fixed a cam 93 provided with a pin 94. At the beginning of the machine cycle cam 93 moves counterclockwise from the position shown permitting a crank arm 95 loosely pivoted on shaft 40 to swing in an anticlockwise direction under the influence of spring 96 until arrested by a stop 97. A link 98 is thus thrust to the right rocking bell crank 99 anticlockwise and causing a stud 100 (Fig. 14) to move past a by-pass dog 101 which is carried on the restoring bar 89. Upon the retrograde movement of the cam 93 and towards the end of the movement thereof, stud 100 will positively cam the restoring bar 89 in a transverse direction and release the keys.

Key-locking mechanism.

In order to lock the keys which have been depressed in depressed position and to lock out the other keys which have not been depressed, key-locking mechanism is provided which will now be described. Each of the various keys is provided with a notch shown at 102 in Fig. 13. These notches are engaged by plates 103 (Fig. 5) having suitable hook projections thereon adapted to engage in the key notches 102 of those keys which are depressed. On the keys which are not depressed plates 103 are adapted to pass under the shoulders 104 on the keys and thereby lock the same and prevent their being depressed. For transversely shifting the locking bars 103 springs 105 (Fig. 5) are provided. Bars 103 are shifted by these springs upon the clockwise rocking of bail 106 loosely mounted on shaft 71. Bail 106 is connected by a lost motion pin and slot connection with a link 107 which connects to an arm 108 fixed to a shaft 109. This shaft also has connected to it an arm 110 which connects to a link 111 having its opposite end forked to straddle shaft 40. Link 111 is provided with a pin 112 fitting in a cam groove 113 on cam 93. Upon the actuation of rock shaft 40 the above traced linkage will be displaced, permitting bail 106 to rock clockwise, thus allowing the locking bars 103 to lock the depressed keys down and the non-depressed keys out. At the end of the machine cycle the parts are moved in reverse direction to restore the locking bars to the position shown in Fig. 5.

Differential mechanism for numeral keys.

Disposed adjacent the lower ends of the numeral keys are bars 114. These bars are provided with stop pieces 115 alternately disposed upon opposite sides of the bars 114 and arranged to form differential stops for these bars. Bars 115 are displaced by means of spring 116. The differential stops are so positioned that with, say, the 9 key depressed, bar 114 will move until stop 115$^a$ contacts with the end of the No. 9 key. The movement of this bar will correspond to 9 units. Correspondingly the other stops are so located as to differentially arrest the bars in accordance with the value of the key depressed.

For permitting the differential bars to move forward under the influence of the springs 116 and to subsequently restore these bars to normal home position a restoring bail 117 (Figs. 4, 5 and 20) is provided. This restoring bail is fixed on shaft 109 and is actuated by the linkage previously described for operating shaft 109. Each of the differential bars 114 has connected to it a link 118, which link in turn connects to a sector piece 119 loosely pivoted on shaft 109 (see Fig. 26). With the machine in normal position bail 117 contacts with the sectors 119, as shown in Fig. 5, and, upon the operation of the machine this bail moves away, as clearly shown in Fig. 20, thus permitting the differential bars to move forward.

Means must be provided for preventing bars 114 from moving to their limit in case no key is depressed and for stopping them at a position corresponding to zero. For this purpose there is fixed to each key detent bail 87 a finger or arm 120. As clearly shown in Fig. 13, the detent bails 87 assume a slightly different position when arresting a depressed key than when another key in the bank is depressed. If no key is depressed the finger pieces 120 will project into the path of zero stop 115$^b$ (Fig. 5). Thus the fingers 120 and stops 115$^b$ constitute zero stops for the differential bars.

The construction of the clerk's key bank and the arrangement of the differential bars therefor is substantially identical to that previously described except that there are a less number of differential stops provided.

Each sector 119 at its upper end is provided with suitable tooth portions 121 which intermesh with pinions fixed to the type wheels. As shown in Fig. 7, there are five amount type wheels 122 and a single type wheel 123 for the clerk's initials.

Punch selector mechanism.

Inasmuch as the punching devices are disposed to one side of the printing section of the machine provision must be made for transposing the setting of the differential bars to the punch selecting mechanism. For this purpose transposer bars 124 are provided, each connected at one end to a differential bar 114 and at their opposite ends connecting to punch selector bars. The group of punch selector bars designated 125 are those for selecting punches for the amounts. The single selector bar 126 is for designating the clerk's number. The selector bars 125 and 126 are slidably mounted to be reciprocated back and forth in accordance with the settings of the differential bars and each amount and clerk's punch selecting bar is provided with an upwardly extending portion notched as shown at 127 in Fig. 20. Punch selector and actuator arms 128 are provided, each carrying a pin 129 engaging in the notches 127. The selector arms 128 are loosely pivoted on a shaft 130. Referring to Fig. 26, it will be seen that there are five punch selector arms 128 for the amounts and a single selector arm marked 131 for the clerk's initials. By imparting differential transverse movements to bars 125 and 126 corresponding arms 128 and 131 assume differential angular positions under the punches 132, and individually align with one or the other of the punches in its column.

*Date and machine number setting mechanism.*

In addition to the keyboard control provision is made for printing the machine number and the date. The machine number setting is fixed in each machine. The date setting may be changed from day to day and includes date setting mechanism for the punches. Each can be changed from time to time as desired. The date printing mechanism is changed by resetting the date printing wheels as will hereinafter be described.

Referring to the card shown in Fig. 3 it will be noted that the clerk's number and the second digit of the date is preferably in the same column on the card. This is done to provide compactness on the card. The date setting mechanisms for these punches will now be described.

As shown in Fig. 1, there is an engraved index plate 133. This plate, if desired, may be disposed inside the casing and entirely covered by a suitable locked door. For clearness in illustration it is shown on the outside of the casing. The index plate is provided with two slots 134 through which project setting levers 135. Each setting lever is provided with a suitable index pointer cooperating with its corresponding numbered scale on the index plate. The user of the machine may manipulate the levers 135 to set up the corresponding day in the month.

Referring now to Fig. 8, each index lever 135 connects to a longitudinally extending bar 136, which, in general construction, is similar to the punch selector bar previously described. Each bar 136 has an upwardly extending portion notched to receive a pin on the punch date selecting arm 137. These selecting arms can be differentially positioned under any one of the punches in its corresponding column. Fig. 8 shows the clerk's number punch selecting bar and arms 126 and 131, which, as previously explained, are in alignment with certain of the date punches. This figure also shows the parts in a moved position after the punches have been forced through the card.

For printing the dates on the card a group of date type wheels 138 (Fig. 10) are provided. These date type wheels are provided with concentric sleeve connections 139 to setting and index wheels 140. These setting and index wheels are suitably engraved upon their periphery and a corresponding index plate designating day of month in units and tens is provided on the machine as shown at 141 in Fig. 1. The custodian of the machine can reach through a suitable aperture in the casing and turn the index wheels 140 to the desired position for setting up the type. For printing the machine number two type wheels 142 are provided. These wheels are set at the factory for a particular machine number and thereafter the setting is not disturbed. The type wheels 142 are impositively locked in position by pins 143 which will permit changing of the set of the type wheel by obtaining access to the interior of the machine.

In order to prevent the date setting wheels jarring from their set position suitable spring-pressed detents 114 are provided as shown in Fig. 5.

*Machine number punch selector.*

In order to set the punches in accordance with the machine numbers punch selector bars 144 are provided. These selector bars are slotted as shown at 145 (Fig. 16), and these slots are adapted to receive pins 146 carried on an adjustable shaft 147. This adjusting shaft is mounted in brackets 148 fixed to a frame portion of the machine and at one end of the shaft there is fixed thereto a sector-shaped piece 149 which is slotted to receive a screw 150 threaded into one of the brackets 148. By tightening this screw the shaft 147 may be held in the position shown with the pins 146 projecting through the notches 145 in the punch arms 144. When it is desired to adjust the punches for another machine number the shaft is rotated through substantially 90° by first loosening the set screw 150 and then manipulating the sector 149. This brings the pins to the dotted line position (Fig. 17). Thereafter the punch arms 144 may be moved back or forward to a position to correspond with the desired machine number. Subsequently the sector 149 is turned back and locked and the punch setting is thereafter held.

The machine is intended to operate not only with cash sales in which the goods are taken away by the customer but also in connection with other transactions in which the goods are delivered to the customer. Means are provided on the machine for setting up and differently designating so-called taken transactions and other transactions.

Under ordinary transactions where the goods are taken the "Taken" designation is printed on the card or check without the manipulation of any key. When goods are not taken the operator depresses a key with the caption "Send", which key is marked 85 in Figs. 1 and 12. The manipulation of this key is adapted to remove a type member 151 shown in Fig. 1 from its printing position which it normally occupies.

Referring now to Figs. 11 and 12, the depression of the send key 85 releases a catch 152 cooperating with spring-moved bar 114ª which is similar to the differential bar heretofore described. Bar 114ª through linkage 153, 154 and 155 is adapted to break a toggle mechanism 156 and thereby draw downwardly the taken type 151 out of printing position. This position of the parts is shown in Fig. 11. In this way ordinary cash transactions are marked "Taken" and on non-taken or send transactions these designating words are omitted from the check.

Cash drawer mechanism.

In addition to controlling the positioning of the type and punches the depression of the clerk's keys 83 through their differential bars 114 are adapted to select and predetermine which cash drawer will open upon the operation of the machine. The cash drawers are spring-opened in the usual manner and retained closed by latches 157. Each latch 157 is released by the depression of one or the other of a series of plunger rods 158. The plunger rods are depressed upon the rocking of the shaft 109 by means of a member 159 which has a shoulder portion 160 adapted to be brought into alignment with one or the other of the plungers 158. Parts 159 and 160 are displaced over one of the other plunger bars by the differential positioning of bars 114. For this purpose there are connected to the ends of the bars 114 pieces 161 which in turn are pivotally connected at 162 to the member 159.

The foregoing description has described the means for setting the punches for operation and the means for setting up the various type elements of the machine. Previous to describing the method of feeding the cards description will be given of the method of punching and printing on a card assuming that a card is in position to be punched and printed upon. As shown in Fig. 6, the punches 132 have their inner ends circumferentially disposed adjacent the punch selector bars. These punches are each provided with individual retaining pins 163 and the punches are also mounted for vertical sliding movement in a punch carrying frame 164. The upper ends of the punches extend into an apertured die-plate 165. Above this die-plate and spaced therefrom by sufficient clearance to permit the entrance of a card is a second die-plate 166 and over this die-plate is an apertured plate 167. The purpose of this last mentioned plate is to permit the chips to be expelled therethrough as they emerge from the upper die-plate. Assuming a card in position over the punches at the proper time in the operation of the machine and the punch selector bars positioned, the punches are forced through the card by rocking a shaft 168 (Figs. 5 and 15). This shaft has fast to it arms 169 which carry the shaft 130 upon which the punch selector bars are loosely mounted. In order to rock shaft 168 the following mechanism is provided as shown in Fig. 15.

Main rock shaft 40 carries an arm 170 carrying a flipper or dog 171, which, upon the rocking of rock shaft 40, is adapted to rock upwardly an arm 172 loosely pivoted on shaft 109. Arm 172 through link 173 connects to shaft 130 thereby drawing upwardly upon this shaft and rocking arms 169 about shaft 168. In this manner the punch selector arms are brought into contact with the punches directly over them and force the punches through the card. Immediately thereafter the punches are retracted by an arm 174 which is fixed to rock shaft 40. This arm 174 presses against a rock arm 175 fixed to the shaft 168 and thereby rocks the same in a clockwise direction thus lowering 130 and retracting the punches.

During the punching operation means are provided for severing the card into a stub and check portion (see Figs. 2 and 3). The cutting knife which severs the card into a check and stub portion is arranged to operate to effect the shearing action just after the punches have punched through the card. In this way the card is anchored in position by the punches which have passed through it and, in addition, the shearing forces occur at a slightly different time in the cycle than those forces which are set up due to the punching of the card. The shearing mechanism comprises a fixed upper knife 176 (Figs. 15, 34 and 35) and a vertically reciprocable lower knife 177. This lower knife has upwardly sloping cutting edges 178 and 179 and is also bowed at 180 (Fig. 35). In this figure the bow end of the knife is exaggerated for the sake of clearness. The knife 180 is yieldingly pressed toward the fixed knife by means of blade springs 181 which are riveted to the knife at their upper ends at 182 and provided with pin and slot slit guides at the bottom as shown at 183. Blade springs 182 abut against the knife guide frame 184 as shown in Fig. 35. This arrangement of the knife including the sloping cutting edges 178, 179, and the body contour 180 provides for distributing the cutting or shearing of the card over an extended time period and also cuts down the section of the card which is being cut at any one time. This also minimizes the necessity of frequently sharpening the cutting knife edges. Fig. 36 shows the punches 132 arranged to shear through the card C slightly in advance of the cutting action of the knife 177 cooperating with fixed knife 176.

Inasmuch as the punches punch upwardly means must be provided for removing the chips which accumulate over plate 167. As shown in Fig. 1 there is a chip exit opening at 185. Extending above plate 167 is a nozzle tube 186 which has a series of nozzle openings pointing towards the exit opening 185. This tube is flexibly connected with a pump cylinder 187. Within cylinder 187 is a piston 188 connected by a rod 189 to an arm 190 which is loosely mounted upon the main operating shaft (see Figs. 37 and 4). In order to give the piston a rapid forward movement and thereby give a sudden blast of air to expel the chips the following mechanism is provided. Fixed to rock shaft 40 is a cam 191. On the anti-clockwise rocking of this cam it engages a pin 192 on arm 190 and restores it to the left in the position shown. Arm 190 when in its extreme rearward position is retained by a bell crank member 193 which is pivoted on the frame of the machine. Upon the clockwise rocking of shaft 109 a link 194 is drawn forwardly which at the end of its stroke lifts latch 193 and allows 190 to be rapidly drawn forward under the influence of operating spring 195. By this construction a comparatively small pump may be used, but nevertheless a sharp blast of air is directed over the plate 167, and the accumulated chips are blown towards the exit opening.

*Printing operation.*

A platen 197 is provided which is suitably pivoted upon a shaft 198, as shown in Fig. 5, and is normally spring-impelled to strike the type by means of the coil spring 199. Assuming the platen springs stressed and the parts shown in Fig. 4, at the time the punching operation takes place, shaft 168 is rocked in a counterclockwise direction. This shaft 168 (see Fig. 9) has fast to it an arm 200 which has connected to it through a pin and slot spring connection a link 201. This link at its upper end is connected to a latch 202 (Figs. 4 and 9), which latch normally engages a dog 203 fixed to the platen shaft and thereby holding the same in retracted position. The elevation of link 201 releases latch 202 from the dog 203 and allows the platen to swing downwardly under the influence of its spring to effect printing upon the card. For restoring the platen and restressing the platen spring a link 204 having a pin and slot connection with an arm 205 fixed to the platen shaft connects at its lower end with an arm 206 fixed on shaft 207. Also fixed on this shaft 207 is an arm 208 (Fig. 4) having a cam roller disposed within cam slot 209 in cam 191. At the proper time in the cycle this cam is rocked thereby pushing upwardly on link 204 and recocking the platen. The link 204 is also utilized to remove a card abutment out of the path of the card, which operation will be hereinafter described in connection with the card feeding devices.

*Card feeding section.*

In the operation of the machine blank cards C are removed from a supply magazine 210. They are then advanced through the machine to the punching and printing mechanism. Here they are printed and punched and severed into two parts. One of these parts containing the punchings marked 211 in Fig. 3 is delivered into a magazine 212 within the machine and the other check portion 213 of the card is fed out of the machine where it can be handed to a customer or utilized as a shipping tag in case the goods are to be sent.

Referring to Figs. 5 and 6, 214 designates a picker which is of conventional form and adapted to move one card at a time from the supply stack. The picker 214 is guided for reciprocating movement on guide rods 215. The picker block 214 is actuated by arms 216 which in turn are actuated by a link 217 connected to an arm 218 fixed to shaft 109. Upon the rocking of shaft 109 in a counterclockwise direction the picker block 214 is moved to the right to advance the lowermost card from the stack. Disposed to the sides of the picker rods 215 are guide rods 219 which slidably guide the clip carriage mechanism (see Figs. 19 to 23 inclusive). The clip carriage comprises a frame 220 having suitable guide blocks 221 and 222 to receive the guide rods 219. The clip carriage is reciprocated back and forth upon the guide rods by a linkage 223 (Fig. 19) which extends to and is fast to the main drive shaft 40 of the machine. The clip mechanism is in duplicate, a pair of clips being provided at each side of the card. Inasmuch as these are identical in construction only one pair of clips will be described. Pivoted to the clip carriage at 223 is an arm 224 which extends transversely and terminates in a lower clip element 225. Pivoted on this arm is a shaft 226 which supports an upper clip 227. These upper and lower clip jaws are normally urged together by means of tension spring 228. In order to open the jaws when the clip carriage is in the position shown in Fig. 23 so that the card from the picker may be received therein, the clip shaft 226 is provided with an arm 229 carrying a follower roller 230 adapted to cooperate with the cam 231. As shown in Fig. 23, the roller 230 has rolled up on cam 231 and opened the clips. This is the position of parts when a card is advanced into the clip carriage by the picker structure. In order to close the clip jaws the movement of shaft 207 which is operated as previously described is utilized. Shaft 207 has fixed to it a member 232 carrying a pin 233. Upon the rocking of shaft 237 anticlockwise pin 233 lifts a pivoted latch plate 234 free from locking engagement with a finger piece 235 which is pivoted on a shaft 236 and fixed thereto. This will displace part 235 to the position shown in Fig. 24 whereupon the cam piece 231 will rock under the influence of the springs in the clip mechanism and permit the clip jaws 225 and 227 to close upon the card in the manner shown in Fig. 24. Subsequently the entire clip carriage moves to the right and advances the card to the printing position. As the card arrives at this position it is stripped from the clips by means of a card abutment 237 (see Fig. 21). The card abutment includes abutment portions supported on a plate-like member 238 (Fig. 1), which plate is fixed upon a shaft 239. Also fixed to this shaft is an arm 240 (see Fig. 9) having a follower roller cooperating with the cam member 241. This cam member is rocked to the position shown in Fig. 4 by means of an arm 242 fixed to shaft 109. In this position the card abutment portions 237 are in the path of the edge of the advancing card and serve to strip the same from the clips. After the card is punched, severed in two and printed, the abutment is withdrawn from the path of the card, which operation is effected by rocking cam 241 clockwise by means of the upward thrust of link 204 (Fig. 9). At this time in the cycle the clips are restored to the left to engage a new card. As an incident to this operation the clips must be lowered out of the card path in order to prevent forcing the card backwardly. The lowering and restoration of the clips to the left will be later described but it will now be assumed that the clips assume the position of Fig. 22 below the path of the card C. It will also be assumed that the abutment 237 has been lifted by the means heretofore described. It is now necessary to discharge the two portions of the card one out of the machine and the other into the storage magazine. When the card C is at the printing and punching position, suitable light blade springs 2-3 shown in Fig. 5 snap down back of the rear edge of the card and prevent its being incidentally shifted rearward. To eject the card from this position pusher members 244 are provided, which pusher members are carried on arms 245 (Fig. 4) fixed on shaft 207. Upon the anticlockwise rocking of shaft 207 these pusher members fall back of the rear edge of the card. Shaft 207 then rotates in a clockwise direction whereupon the pusher members advance the card previously at the printing position forwardly to cause the leading edges of the check and stub to advance into the bight of feed rolls 246 and 247. As shown in Fig. 18 the feed rolls 246 feed the receipt portion 213 of the card out of the machine, whereas feed rolls 247 feed the stub portion 211 of the card into the receptacle 212.

In order to drive the discharge rolls 246 and 247 the upper shaft 250 carrying upper pairs of rolls 246 and 247 is provided with a pinion 251 meshing with a sector 252 (Figs. 1 and 25). This sector is actuated by a link 253 from an arm 254 fixed to shaft 40.

The means for disengaging the clips out of the path of the card to permit the clip carriage to return without pushing back the card which is being discharged will now be described. Referring to Fig. 21, this shows the condition of the cards just before the clip carriage reaches its extreme right hand position. Slidably fastened on the clip carriage is a piece 255 carrying a shoulder portion 256 normally abutting against pin 257 on the clip carrying arm 254. Upon the extreme movement of the clip carriage to the right a fixed shaft or stud 258 abuts against depending shoulder 259 on part 255 and displaces it to the left allowing portion 256 to move from under pin 257. Springs 260 now draw downwardly the clip carrying bar 224 thus displacing the clips out of the path of the card. The clips are again restored to upper position by the roller 230 riding up on cam 231, which action puts the clips in the position shown in Fig. 23.

It will be understood from the showing of the parts in Fig. 19 that the printed card portions are being expelled from the machine as a new card which is not yet punched or printed is being drawn into position for the next subsequent punching and printing operation. Consequently the machine in its normal condition has an unpunched card in the punching and printing section.

The container for the preferred stubs 212 may be provided with a suitable hinged cover 261 which, if desired, may be locked so as to prevent access thereto by unauthorized persons. In order to facilitate removal of the stubs from the magazine an L-shape or angle piece 262 may be provided having a handle portion 263 to permit the ready withdrawal of the group of stubs within the magazine.

In addition to printing and perforating the check provision is made for permitting the operator of the machine to write with a pencil or pen upon the perforated stub portion of the check prior to effecting the printing operation. For this purpose suitable writing opening 265 is provided in the cabinet of the machine. Through this opening the operator can write on the stub portion of the check before it is perforated and thus put any designating mark thereon such as his or her initials or any other written matter such as the name or account number of the customer.

In describing the construction of the machine its operation and the operation of the various parts thereof have been incidentally described to such an extent that it is thought no further statement of operation is necessary.

While the embodiment above shown and described is obviously adapted to fulfill the purposes hereinbefore stated, it is not the purpose to limit the invention to a specific embodiment, as the inventive ideas are capable of changes and alterations and uses in other embodiments all coming within the scope of the claims which follow.

What I claim is—

1. In a machine of the class described, the combination with a series of depressible keys, of devices associated therewith for automatically returning a depressed key to undepressed position upon depression of another key when said keys are operated in a certain sequence and for preventing the automatic return of a depressed key upon depression of another key when said keys are operated in a different sequence and means controlled by the keys when depressed.

2. In a machine of the class described, the combination with a series of depressible keys, of devices associated therewith comprising a pawl pivoted on one of the keys whereby a depressed key will be returned to undepressed position when said keys are operated in one sequence and one key retained in depressed position upon depression of another key when said keys are depressed in a different sequence and means controlled by the keys when depressed.

3. In a machine of the class described, the combination with a plurality of depressible keys, of devices associated with said keys for automatically returning a depressed key to undepressed position upon depression of another key when said keys are operated in a certain sequence and one key retained in depressed position upon depression of another key when said keys are depressed in a different sequence, and accounting devices independently controlled by said keys.

4. In a machine of the class described, the combination with a plurality of series of punches, of a main operating mechanism, a device given an invariable extent of movement at each operation of the main operating mechanism, punch operators pivotally mounted on said device, and means for differentially angularly adjusting the punch operators on their pivots to select the punches to be operated by movement of the invariably moved device.

5. In a machine of the class described, the combination with a pluarlity of series of punches, of a main operating mechanism, a device given an invariable extent of movement at each operation of the main operating mechanism, punch operating arms pivotally mounted on said device, a keyboard, and means controlled by the keyboard for adjusting the punch operators angularly on their pivots to select the punches to be actuated by the operation of the main operating mechanism.

6. In a machine of the class described, the combination with a main operating mechanism, of an oscillatory shaft, arms secured to and extending radially from said shaft, a rod supported by the outer ends of said arms, punch operators pivoted on said rod, a plurality of series of punches, a keyboard, means controlled by the keyboard for differentially angularly adjusting the punch operators on their pivot rod to select the punches to be operated, and devices for oscillating the aforesaid shaft at each operation of the main operating mechanism to cause the punch operators to actuate the selected punches.

7. In a machine of the class described, the combination with a main operating mechanism and a motor for driving same, of devices for starting and stopping the motor and the driving mechanism, manipulative means for controlling said devices, a card supply magazine and means for withdrawing cards therefrom by operations of the main operating mechanism, and means whereby emptying the card magazine will render the manipulative means ineffective and replenishing the supply of cards will render the manipulative means effective.

8. In a machine of the class described, the combination with a main operating mechanism and a motor for driving same, of devices for starting and stopping the motor and the driving mechanism, manipulative means for controlling said devices, a card supply magazine and means for withdrawing cards therefrom by operations of the main operating mechanism, and devices controlled by the cards in the magazine for connecting and disconnecting the manipulative means from the starting and aforesaid stopping devices.

9. In a machine of the class described, the combination with a main operating mechanism, of a card supply magazine, means actuated by the main operating mechanism for withdrawing cards from the magazine, a lock for the main operating mechanism effective to prevent operation of said mechanism when the magazine is emptied, and means whereby supplying cards to the magazine will render the lock ineffective.

10. In a machine of the class described, the combination with a main operating mechanism, of a card supply magazine, means actuated by the main operating mechanism for withdrawing cards from the magazine, devices rendered effective by withdrawal of the last card for locking the main operating mechanism against operation, and means whereby replenishing the supply of cards will release said locking devices.

11. In a machine of the class described, the combination with devices for punching records in a record material, of an operating mechanism for actuating said devices, a blower for blowing the punchings away from the perforating devices, means actuated by the operating mechanism for filling the blower, a latch for preventing the blower from performing its function until the latch is tripped, connections actuated by the operating mechanism for releasing the latch, and devices for operating the blower after the latch is tripped.

12. In a machine of the class described, the combination with devices for punching records in a record material, of an operating mechanism having an invariable extent of movement for actuating said devices, a blower for blowing the punchings away from the perforating devices, means actuated by the operating mechanism for filling the blower, a latch for preventing the blower from performing its function until the latch is tripped, connections actuated by the operating mechanism for releasing the latch, and devices for operating the blower independently of the operating mechanism after the latch is released.

13. In a machine of the class described, the combination with devices for punching records in a record material, an operating mechanism having an invariable extent of movement for actuating said devices, a blower comprising a piston for blowing the chips away from the perforating devices, means actuated by the operating mechanism for moving the piston in one direction to draw air into the blower, a latch for preventing return movement of the piston until the latch is tripped, connections actuated by the operating mechanism for tripping the latch, and means comprising a spring for giving the piston its return movement after the latch is tripped.

14. In a machine of the class described, the combination with a main operating mechanism, of manipulative devices, a group of punch selectors and operators adjustable under the control of the manipulative devices to represent variable matter, a group of punch selectors and operators disposed for relative adjustment and to be set in assembling the machine to represent invariable matter, and means for actuating all of the punch selectors and operators by operation of the main operating mechanism.

15. In a machine of the class described, the combination with a main operating mechanism, of a device given a fixed extent of movement at each operation of the main operating mechanism, a keyboard, a group of punch selectors and operators pivoted on said device and adjustable under the control of the keyboard to represent variable matter, a second group of punch selectors and operators also pivoted on said device and manually pivotally adjustable to represent invariable matter such as a machine number, and means for locking the last mentioned punch operators against pivotal adjustment on their pivots.

16. In a machine of the class described, the combination with a main operating mechanism, of a device given a fixed extent of movement at each operation of the main operating mechanism, a keyboard, a group of punch selectors and operators pivoted on said device and adjustable under the control of the keyboard to represent variable matter, a second group of punch selectors and operators also pivoted on said device and manually adjustably set in assembling to represent invariable matter such as a machine number, devices for locking the last mentioned punch operators in adjusted position, said devices retaining said operators locked during a plurality of machine operations until a new readjustment thereof is made, and a machine casing constructed to prevent access to said locking devices.

17. In a machine of the class described, the combination with a main operating mechanism, of manipulative devices, a group of punch operators adjustable under control of the manipulative devices to represent variable matter, a group of punch operators which are individually adjustable only in assembling the machine and which are finally set in assembling the machine to represent invariable matter, means comprising a shaft for locking the latter set of punch operators in assembled position, a casing constructed to prevent access to said locking means, and connections for actuating all of the punch operators by operation of the main operating mechanism.

18. In a machine of the class described, the combination with a set of punches, of devices for feeding cards to and away from the punches, means for actuating the punches to perforate records in the cards, devices for severing the cards between operations of the feeding devices, and means for actuating the severing devices before the punches are withdrawn from the perforations in the card.

19. In a machine of the class described, the combination with a set of punches, of devices for feeding record cards to and away from the punches, means for actuating the punches to perforate records in the cards, devices for severing the cards between operations of the feeding devices, and means for actuating the severing devices after the punches have been actuated and before said punches are withdrawn from the perforations in the card.

20. In a machine of the class described, the combination with a set of punches, of devices for feeding cards to and away from the punches, means for actuating the punches to perforate records in the cards, a stationary knife, a movable knife having cutting edges converging in a point intermediate the ends of the knife and bowed so that the knife will be given a rocking movement when moved relative to the stationary knife, springs for holding the cutting edges of the movable knife in contact with the stationary knife, and means for actuating the movable knife before the punches are withdrawn from the perforations in the card.

21. In a machine of the class described, the combination with a stationary knife, a movable knife having cutting edges converging in a point intermediate the ends of the knife and bowed so that the knife will be given a rocking movement when moved relative to the stationary knife, springs for holding the cutting edges of the movable knife in contact with the stationary knife, and means for actuating the movable knife.

In testimony whereof I hereto affix my signature.

JOHN ROYDEN PEIRCE.